April 28, 1959 — C. L. SHELAMER, SR — 2,883,712
KNOCKDOWN TRAILER PORCH
Filed Jan. 10, 1957 — 2 Sheets-Sheet 1
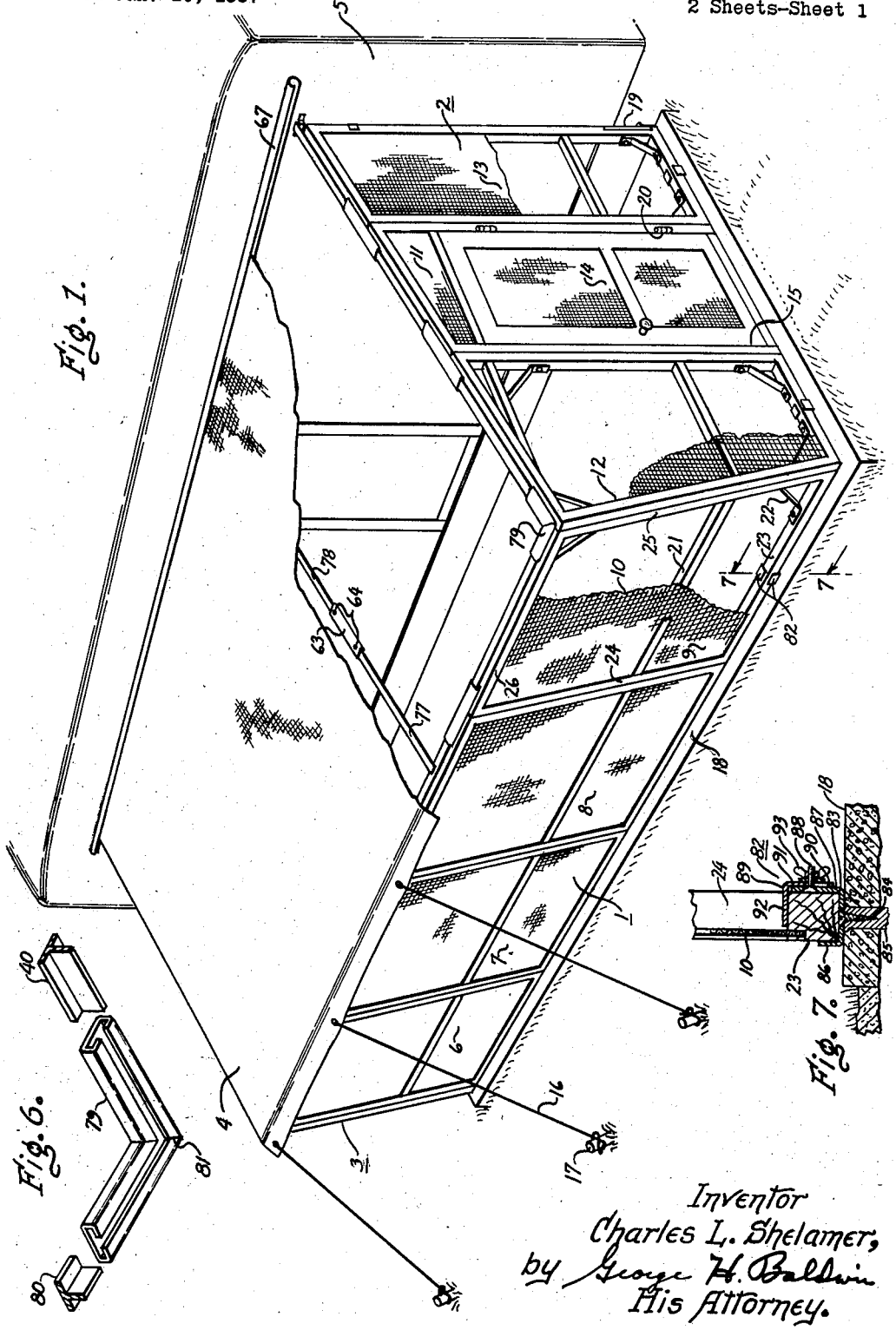
Inventor
Charles L. Shelamer,
by George H. Baldwin
His Attorney.

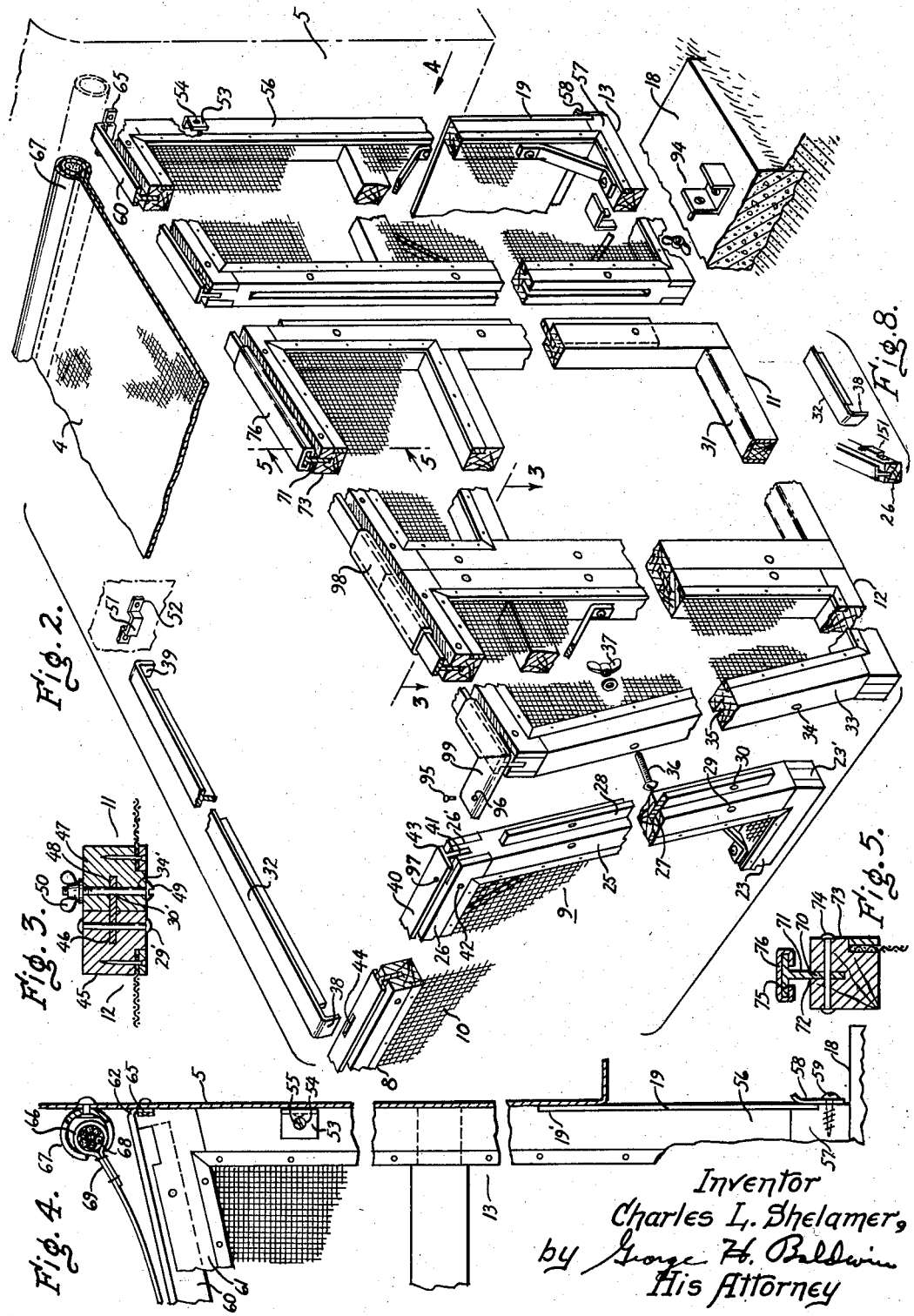

United States Patent Office 2,883,712
Patented Apr. 28, 1959

2,883,712

KNOCKDOWN TRAILER PORCH

Charles L. Shelamer, Sr., Jacksonville, Fla., assignor of twenty-five percent to Ione Huntley, Middleburg, Florida Application January 10, 1957, Serial No. 633,476

3 Claims. (Cl. 20—2)

This invention relates to portable trailer shelters, and more particularly to a screened trailer porch of prefabricated or knockdown construction.

A general object of the invention is to provide an improved screened shelter which is adapted for use in conjunction with house trailers and which may be readily assembled and disassembled.

The use of house trailers or mobile homes has increased greatly recently and many trailer parks exist which provide utility cut-ins and concrete slab patios or floors alongside the trailer parking space for the living convenience of the trailer owners. It is desirable to increase the living area of trailers in an economical way. An object of this invention is to provide an inexpensive, prefabricated, disassemblable, and readily storable or transportable screened shelter useful in connection with such trailers and patios, furnishing a ventilated, comfortable, temporary or semi-permanent, attractive, rain-sheltered porch for the use, primarily, of the trailer occupants.

More specific objects of this invention are to provide a sturdy and lightweight knockdown trailer porch, which is inexpensive to manufacture and which is readily adaptable for trailers of varying lengths, and further to provide, in such a structure, a plurality of screened panels which may be readily transported or stored in a relatively small space and which form, when assembled, in conjunction with a trailer and a concrete slab or other ground-supported floor, a durable, rigid, insect-proof shelter with free circulation of air.

A specific object of the invention is the provision in a knockdown trailer porch comprising a plurality of constituent panels forming the side and end walls, of secure yet readily separable means for joining the panel edges one to the next, together with secure, rigid, yet readily separable means for maintaining the upper edges of the panels in alignment and in desired position with respect to the house trailer.

A further specific object of the invention is to provide a knockdown trailer porch having improved trailer attachment means and improved means for securing the assembled porch to concrete or other types of flooring.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Fig. 1 is a view in perspective, partially broken away, of a trailer porch embodying the invention;

Fig. 2 is a perspective view showing portions of the component parts of the trailer porch of Fig. 1 in exploded positions;

Fig. 3 is a sectional view taken along line 3—3 of Fig. 2 showing the manner in which the panels are joined together;

Fig. 4 is an enlarged, detail, fragmentary, partially sectional view of one end of the trailer porch taken in the direction of arrow 4 of Fig. 2;

Fig. 5 is a sectional view taken along line 5—5 of Fig. 2 showing a T-rail imbedded in the top of a panel;

Fig. 6 is an exploded view in perspective of a corner sleeve and T-rail arrangement;

Fig. 7 is a sectional view taken along line 7—7 showing the clamping device for securing the porch to the flooring; and Fig. 8 is an exploded view of a modified attachment of a rafter to a side wall panel.

The trailer porch is shown in Fig. 1 in its erected or assembled form and includes an upwardly and outwardly inclined front side wall 1, vertically upstanding end walls 2 and 3, and a cover or roof member 4 of flexible waterproof material such as duck, canvas, plastic sheeting or the like. The back side wall of the porch is provided by the house trailer front wall 5 to which the porch is attached in its assembled form.

Front side wall 1 is made up of a plurality of framed side wall panels 6, 7, 8 and 9, the outer face of each panel being covered with wire or other screening 10 which is capable of excluding insects. The end walls are similarly formed and one end wall, such as end wall 2, is provided with a screen door receiving panel 11, intermediate tapered end front panel 12 and end rear panel 13. A screen door 14 is provided for the screen door opening 15 and attached to panel 11 by hinges 20. Opposite end wall 3 is similarly made up of a plurality of panels. A solidly screened panel may take the place in wall 3 of the screen door panel of end wall 2, if desired, or the end walls may be identical, providing two entrance doors, one at each end of the porch.

The enclosed porch defined by the side and end walls and the trailer front wall is covered by flexible roof member 4 which extends from its releasably attached edge adjacent or at the trailer front wall to its outer edge, which overhangs the top of front side wall 1 and whereat it is secured in its extended position by suitable fastening means such as the ropes 16 and stakes 17. It will be understood that the porch is resting on and secured to the flooring, here shown as concrete slab 18. The porch enclosure is completed by rear filler panel 19 of pressed wood sheeting, plywood or the like, which operates as a closure for the space existing between slab 18 and the bottom edge of trailer front wall 5. The panels are strengthened by crossmembers such as crossmember 21 joining the stanchions of panel 9, and also by securely affixed rigid metal braces such as brace 22 attached to bottom member 23 and stanchion 25 of panel 9. It will be noted that the over-all length of the trailer porch may be adjusted in steps by utilizing more or fewer front side panels and correspondingly varying the length of filler panel 19.

The general arrangement of panel 9 is seen in Fig. 1 to comprise a sill or bottom frame member 23, upstanding side frame members or stanchions 24 and 25 and a top frame member 26. Further details of the panel construction are shown in Fig. 2 wherein front side wall panel 9 comprises bottom member 23 joined to stanchions 24 and 25 and top member 26 joined to the upper end of the stanchions. Joints 23' and 26' between the bottom and top members respectively and the stanchion should be rigid, strong joints such as of the open mortise type shown. Side stanchion 25 is provided with an elongated groove 27 which carries an elongated metal strip partially imbedded in the groove with its exposed portion comprising a tongue 28 which extends along the stanchion and which projects toward the adjacent panel, which in this case is end front panel 12. Side stanchion 24 is provided with a similar groove to receive the extending tongue, similar to tongue 28, of adjacent panel 8. The strip, of which tongue 28 comprises the exposed part, is held securely imbedded in stanchion 25 by rivets 29 and the exposed tongue portion 28 of the strip is provided with a plurality of openings 30. The grooved stanchion 33 of end front panel 12 is provided with similar openings or bores 34 which pass laterally through each side portion of the groove. This tongue and groove arrangement is duplicated in the other panels, providing each with a grooved side stanchion and a tongue bearing side stanchion, with the exception of the end rear panels adjacent the trailer front wall. Thus, for example, when front side wall panel 9 is joined to end front panel 12, tongue 28 fittingly engages in groove 35 of end front panel 12 and openings 30 of the tongue are aligned with bores 34 of stanchion 33. Removable assembly bolts 36 are then placed through corresponding openings 30 and bores 34 and wing nuts 37 are threaded onto the bolts thereby holding the tongue locked in the groove and front side wall panel 9 locked to end front panel 12. Each panel is locked to the next adjoining panel in a similar manner to provide the erected side and end walls of the porch.

It will be noted that the bottom member or sill 31 of screen door panel 11 is partially enclosed in metal for wear resistance.

Top member 26 of front side wall panel 9 has its uppermost face grooved to receive an elongated T-rail section or T-rail 40 which has its downwardly projecting base portion or web 41 imbedded in the grooved top member and is permanently secured therein by rivets 42. The T-rail has its flange 43 extending along and spaced upwardly from or above the uppermost face of top member 26, the flange being joined along the web 41. It will be noted that the T-rail extends the entire length of the panel and its ends are preferably flush with the exposed faces of the respective stanchions of the panel. The top member of each of the panels is similarly provided with a like T-rail. Among the functions of each T-rail is the imparting of additional rigidity to the panels.

Depending on the length of the porch, one or more T-rail rafters or T-rafters, such as T-rafter 32, are provided to support the front side wall and link the front side wall panels with the trailer front wall and to support roof member 4. T-rafter 32 is preferably formed from the same stock as is used for the T-rails for the panels. The extreme front and rear portions of the flange of each rafter extend beyond its web and bend downwardly to form a front rafter hook 38 and a rear rafter hook 39, respectively. As shown, front rafter hook receiving slots are provided in the flanges of the side wall panel T-rails, such as rafter slot 44 in flange 43 which receives the front rafter hook 38. Small catches or fasteners identical with fastener 65 for the end rear panel T-rail, such as rafter fastener 51, are affixed, such as by rivets or bolts 52, to the trailer front wall immediately below channel 67 and receive the rear rafter hooks, such as rear rafter hook 39. As shown in Fig. 1, each T-rafter may comprise two or more T-rafter sections 77 and 78 releasably joined together by a straight sleeve 63 to permit separation of the T-rafters for compactness of the disassembled porch. Removable pins 64 may be provided to lock the sleeve 63 to the rafter sections, and a similar pin 95 is shown in Fig. 2 which may enter opening 96 of the corner sleeve and opening 97 of flange 43 to lock the corner sleeve, if desired, to flange 43. Such pins may be employed in connection with other sleeves as may be found necessary, although sufficient rigidity of the porch usually is obtainable without the pin in the panel T-rail joining sleeves.

Straight channel members or sleeves, such as sleeve 98 joining the T-rails of end front panel 12 and screen door panel 11, are provided to join the T-rails of the panels and to maintain the panels in straight alignment one to the other. L-shaped or right angle sleeves, such as corner sleeve 99 joining the T-rails of side wall panel 9 and end front panel 12, join the panels forming the corners of the trailer porch.

The details of the panel interlocking tongue and groove construction are portrayed in the sectional view of Fig. 3, which shows the joinder of end front panel 12 to screen door panel 11. As seen, stanchion 45 of panel 12 has metal strip 46 imbedded therein and secured by rivets 29' similar to rivets 29. The stanchion 47 of screen door panel 11 which adjoins stanchion 45 is provided with a groove, similar to groove 35 of stanchion 33, which receives tongue portion 48 of strip 46. As hereinbefore described with respect to tongue 28, the openings 30' in tongue 48 and the bores 34' in stanchion 47 are aligned with each other to rerceive assembly bolt 49, therethrough when the tongue is in proper position in the tongue receiving groove of stanchion 47. Assembly bolt 49 is inserted through the bore 34' in the stanchion and the aligned opening 30' in the tongue 48 to lock the tongue in assembled position to the stanchion. Wing nuts, such as wing nut 50, are finally threaded onto the protruding end of the bolt inside the porch and tightened thereon, thus completing the panel interlock construction. Bores 34' and openings 30' of the stanchion and tongue respectively are positioned to cause stanchions 45 and 47 to be in firm contact with a minimum crack or space therebetween to insure against the passage of insects wherever the crack is not spanned by the tongue.

The mode of attachment of the porch to the trailer front wall 5 is best seen in the enlarged view of Fig. 4 which shows end rear panel 13 connected to the trailer front wall by L-shaped bracket 53, which has one leg secured to the trailer wall by riveting or other suitable means, and has its other leg extending at substantially a right angle from the trailer wall. The extended leg is provided with an aperture 54 to receive a bracket bolt 55 which passes through inner stanchion 56 of end rear panel 13 and is secured by a wing nut on the inner side of the stanchion thus holding end rear panel 13 tightly against the trailer front wall. The rear face of stanchion 56 and the upper portion of the rearward end of bottom member 57 are notched at 19' to permit the insertion of filler panel 19 which may consist of pressed wood, plywood or other suitable material. It will be noted that the panel 19 is of sufficient height to engage the trailer front wall against which is seals and the notch 19' is proportioned to receive the panel. The panel 19 is held against the inner stanchion 56 by a metal plate or clip 58 formed to receive the panel 19. The clip 58 is affixed to wall panel 13 such as by wood screw 59.

T-rail 60 imbedded in top member 61 of end rear panel 13 has the extreme rear end portion of its flange extending rearwardly of its web and bent downwardly to form a hook 62 which removably engages in a small catch or fastener 65. Fastener 65 is securely affixed to the trailer wall by riveting or by other suitable means and may remain attached to the trailer when the porch is disassembled. The corresponding end rear panel of opposite end wall 3 is similarly attached to the trailer front wall. A watertight fit between roof member 4 and trailer front wall 5 is provided by the engagement of an enlarged seam or bead 66 constituting the inner edge of roof member 4 within an elongated slotted tube or C-shaped channel member 67 attached along the trailer front wall 5 slightly above the fasteners, such as fastener 65. The looped end 69 of the roof is filled and enlarged by a rope or cord 68 passing longitudinally through the looped end. The enlarged seam or bead 66 formed thereby is pulled into one end of channel member 67 into the position shown. The channel member 67 and bead 66 are shown enlarged beyond desired proportionate size in the drawing for clarity. As seen in Fig. 1, the roof member 4 and channel member 67 extend the entire length of the porch with an overhang at each end.

The construction of the T-rails and their attachment to the top members of the panels as well as the close, sliding fit of the straight sleeves on the T-rails is best seen in the detailed view of Fig. 5. A substantial portion of web 70 of T-rail 71 is imbedded in top groove 72 which runs longitudinally of top member 73 of panel 11 and is secured therein by rivets 74 which pierce the top member laterally and extend through web 70. The flange 75 of the T-rail is disposed spaced a short distance above the member 73. Longitudinally slotted straight sleeve 76, which is proportioned to substantially enclose the flange, is seen snugly engaging flange 75 in a sliding fit.

The construction of angular or corner sleeve 79 and its engagement with T-rail 40 of side wall panel 9 and T-rail 80 of end front panel 12 is best seen in the exploded view of Fig. 6. It will be seen that corner sleeve 79 may be conveniently constructed from two straight sleeves similar to straight sleeve 76 each of which has one mitered end, the two sleeves being secured together along their mitered ends by a weld as at 81 to form the L-shaped right angle corner sleeve 79.

As shown in Fig. 8, the outer end of rafter 32 may fit a bracket 151, similar to bracket 51, arranged on the upper panel member 26 rather than being fitted into slot 44.

The details of the metal clamping device 82 for securing the panels to the flooring of the trailer porch, here indicated as concrete slab 18, are shown in the enlarged view of Fig. 7. The U-shaped base member or base 83 of the clamping device is secured to the slab by a flat headed screw 84 which is threaded into a conventional lead anchor 85 set into the concrete. It will be noted that the outer leg 86 of the base is shorter than its inner leg 87 and that the inner leg is provided with a countersunk hole through which a short flat headed clamp bolt 88 extends inwardly. Bottom member 23 of side wall panel 9 is cradled in base 83, and it retains clamp bolt 88 in position during installation. The inverted L-shaped top element or top 89 of the clamping device has a slot 90 entering the lower edge of its downwardly extending leg 91, which slot receives clamp bolt 88, its horizontally extending leg 92 contacting the upper surface of bottom member 23. Wing nut 93 is then threaded onto clamp bolt 88 and tightened to lock the top and base of the clamping device together substantially around bottom member 23, and thereby to affix the bottom member to the concrete slab. Leg 92 of upper member 89 is foreshortened sufficiently to clear the screening of the panel.

The clamping device 82 of Fig. 7 is duplicated in the clamping device 94, seen in an exploded position in Fig. 2 which clarifies the relationship of its cooperating elements. All of the component parts herein referred to throughout as being of metal are preferably made from a metal which is light in weight, strong and reasonably non-corrosive, such as an aluminum alloy. The panel frame members are preferably of wood.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a prefabricated, disassemblable building structure, the combination of a first and a second panel, each of said panels comprising a top frame member, a bottom frame member and a pair of side stanchions joined by said top and bottom frame members, said top frame member and said side stanchions of each said panel having elongated grooves therein, each said groove having substantially the same width and depth dimensions, an elongated metal strip having an elongated edge portion thereof securely imbedded in said groove of one of said side stanchions of each panel and having an opposite elongated edge portion thereof extending outwardly from the stanchion to form an elongated tongue, the tongue of said first panel engaging in the groove of the other said stanchion of said second panel, bolts passing laterally through said other stanchion of said second panel and through the portion of the tongue engaged in the groove thereof thereby to lock said panels in edge-to-edge relation, a respective elongated metal T-rail section substantially coextensive with the top frame member of each said panel, each said T-rail section having its web securely imbedded in the groove of and extending upwardly from and along the respective said top frame member and having its flange spaced a short distance above and extending along the respective top frame member, said T-rail section of said first panel having an end adjacent an end of said T-rail section of said second panel, a channeled sleeve extending between said panels and having opposite end portions engaged in a close sliding fit on the respective flanges of the T-rail sections of said panels and enclosing said adjacent ends of said respective T-rail sections, and a floor-attachment metal clamp releasably connected to the bottom frame member of one of said panels.

2. In combination with a house trailer and a ground-contacting floor adjacent said trailer, a three-walled knock-down trailer porch comprising a plurality of framed screened panels forming an outwardly and upwardly inclined side wall and forming a pair of upstanding end walls having top edges inclined from said side wall upwardly toward said trailer, each said panel comprising top, bottom and side frame members, metal tongue and groove means joining said panels along their side edges each to the next, metal T-rail sections for each said panel and having their webs securely imbedded in the respective top frame members of said panels and having their flanges spaced a short distance above and extending along the respective top frame member of said panels, a respective channeled sleeve extending between each adjoining pair of said panels and engaged in a close sliding fit on the respective T-rail section flanges of each said pair of panels, a plurality of T-rail rafters each having one end releasably connected to a side wall panel T-rail section flange, metal fastener means adapted to be secured to the trailer and receiving the other ends of said T-rail rafters, each of the innermost panels of each end wall having one edge at said trailer, means removably attached to each said one edge and adapted releasably to secure such panel edge to the trailer, metal clamping means adapted for rigid attachment to said floor and releasably connected to the bottom frame members of selected ones of said panels, and a flexible roof member having an inner edge adapted for releasable attachment to the trailer, said roof member extending outwardly from its inner edge covering the enclosure defined by said side and end walls and supported on said T-rail rafters and said T-rail section flanges.

3. In a combination with a house trailer and a ground supported floor adjacent said trailer, a knock-down trailer porch comprising a plurality of screened panels forming an inclined side wall and a pair of upstanding end walls, the panels of said side wall being inclined outwardly and upwardly, the panels of said end walls having top edges inclined from said side wall upwardly toward said trailer, each of said panels having a wooden top frame member and a wooden bottom frame member and oppositely disposed wooden side stanchions joined by said top frame member and said bottom frame member, said top frame member and said side stanchions of each panel having elongated grooves therein, means joining said panels each to the next in edge-to-edge relationship, said means comprising an elongated metal strip riveted in the groove of one said stanchion and extending therefrom to form an elongated tongue, the tongue of said one stanchion engaging in the groove of the other said stanchion of the next adjacent said panel, said means further comprising bolts passing laterally through said last mentioned other stanchion and through the tongue enclosed therein thereby locking the tongue in the groove of said other stanchion, a respective elongated metal T-rail section for the top frame member of each panel having its web partially imbedded and riveted in the groove of and extending upwardly from and along each said top frame member and having its flange disposed a short distance above and extending along the top frame member of the panel, a respective longitudinally channeled sleeve extending between the two panels of each pair of adjacent panels and having its opposite ends engaged in a close sliding fit on the flanges of the respective T-rail sections of the respective pair of panels, a metal clamp device for securing selected ones of said panels to said floor and comprising an upstanding U-shaped base adapted for attachment to said floor, said base having upwardly extending legs cradling said bottom member of the selected panel, said device further comprising an inverted L-shaped top element having a horizontal leg engaging the top of said bottom member and having a downwardly extending leg with a slot entering its lower edge and a clamp bolt extending through one said leg of said base and through said slot in said downwardly extending leg of said top element and a wing nut threaded onto said clamp bolt locking said base and said top element together retainingly about said bottom member of the selected panel, a plurality of T-rail rafters each comprising a flange having downwardly directed opposite end portions, each said rafter extending between a side wall panel and the trailer front wall, selected ones of said side wall panel T-rail sections being provided with slots receiving one of the downwardly directed flange end portions of each said T-rail rafter, the T-rail sections for the end wall panels which adjoin the trailer front wall having downwardly directed flange end portions at said trailer front wall, a plurality of respective fasteners adapted for attachment to the trailer front wall, selected ones of said fasteners receiving the other downwardly directed flange end portion of a respective said T-rail rafter, selected others of said fasteners receiving a respective said downwardly directed flange end portion at said trailer front wall, a flexible roof member having an inner edge adjacent said other flange end portions of said T-rail rafters and extending outwardly from said inner edge and covering the enclosure defined by said side and end walls and supported on said T-rail rafters and said T-rail section flanges, and means adapted for attachment to said trailer front wall adjacently above said fasteners releasably attached to said inner edge of said roof member.

References Cited in the file of this patent

UNITED STATES PATENTS

| | | |
|---|---|---|
| 1,371,897 | Hoy | Mar. 15, 1921 |
| 1,487,583 | Loeffler | Mar. 18, 1924 |
| 1,519,627 | Oliver | Dec. 16, 1924 |
| 2,745,420 | Zitomer | May 15, 1956 |
| 2,765,498 | Kelnhofer | Oct. 9, 1956 |